Dec. 14, 1971   R. M. CHURCH   3,626,719
MECHANICAL POWER TRANSMISSION COUPLING

Filed June 26, 1970   2 Sheets-Sheet 1

INVENTOR
ROBERT M. CHURCH
BY
Hobbs & Green
ATTORNEYS

Dec. 14, 1971 R. M. CHURCH 3,626,719
MECHANICAL POWER TRANSMISSION COUPLING
Filed June 26, 1970 2 Sheets-Sheet 2

INVENTOR
ROBERT M. CHURCH
BY Hobbs & Green
ATTORNEYS

United States Patent Office 3,626,719
Patented Dec. 14, 1971

3,626,719
MECHANICAL POWER TRANSMISSION COUPLING
Robert M. Church, 126 Knox Drive,
West Lafayette, Ind. 47906
Filed June 26, 1970, Ser. No. 50,114
Int. Cl. F16d 3/00
U.S. Cl. 64—6                                   11 Claims

ABSTRACT OF THE DISCLOSURE

A mechanical power transmission coupling structure particularly suitable for use with a rolling mill having a roll with a neck or drive shaft connected to the roll, in which the coupling structure includes lands on the roll neck and a connector with a bore having corresponding lands therein for mounting on the roll neck. Fluid operated pistons disposed in cylinders in the neck engage the lands on the adapter to form a firm connection between the coupling and the roll. The fluid, which is preferably hydraulic, is transmitted to the cylinders in the roll neck through passages in the roll. When the pistons are actuated, the lands on the roll neck seat on the lands of the adapter, thereby eliminating or minimizing movement between the parts and preventing fretting, excessive wear, and backlash.

---

Drives for heavy equipment such as rolling mills often include direct mechanical connections between drive shafts and the driven rolls to provide a positive drive for the rolls. In view of the high torque transmitted between the drive motors, shafts, and rolls, there is a significant tendency for the interengaging operating parts to have excessive fretting and wear, which results in premature failure or requires an excessive amount of service in order to maintain the power transmission system in optimum operating condition. The shafts, bearings, and couplings are relatively large and heavy, and hence often difficult to assemble and disassemble, especially where close tolerances are maintained to minimize fretting, vibration, and backlash. This increases the maintenance cost, including services, repairs, and replacements, often resulting in excessive downtime for the entire rolling mill system. It is, therefore, one of the principal objects of the invention to provide a mechanical power transmission coupling for connecting rolling mill rolls and drive shafts, which is so constructed and arranged that it can be easily assembled and connected into operating position with a relatively loose fit between the parts, and which is adjusted after it is installed to eliminate movement between the parts and hence minimize fretting and wear and avoid backlash in the coupling and power transmission train.

Another object of the invention is to provide a power transmission coupling between driving and driven parts, in which the coupling is locked hydraulically, so that the coupling positively interconnects the two parts in such a manner that there is, in effect, zero tolerance between the force transmitting parts and coupling, under all normal operating conditions, and which may yield sufficiently under abnormally high forces or reverse torque to cushion the forces and dampen excess torsional vibration of the parts and coupling.

Still another object of the invention is to provide a coupling for use with rolling mill rolls which has a relatively loose fit with the adapter for the neck of the rolls as it is installed, and which provides improved conformance during the operation between the roll neck and the adapter or coupling flange.

A further object is to provide a mechanical power transmission coupling of the aforesaid type having a means for locking the coupling to the shaft, in which the coupling locking and unlocking operations can be controlled from a remote location, and which is relatively simple in construction and design and substantially service free over long periods of operation.

Additional objects and advantages of the present invention will become apparent from the following description and accompanying drawings, wherein.

Figure 1:
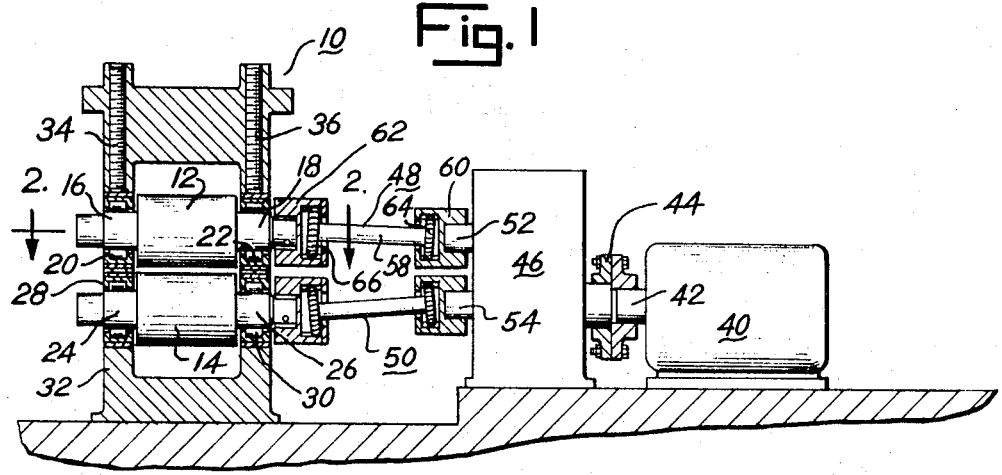
FIG. 1 is an elevational view of a rolling mill and drive assembly showing the rolling mill and the present mechanical power transmission couplings in sections.

Referring more specifically to the drawings, and to FIG. 1 in particular, numeral 10 indicates generally a rolling mill, which for the purpose of the present description may be considered conventional, having upper roll 12 and lower roll 14, the two necks 16 and 18 of the upper roll being journalled in bearings 20 and 22, and the two necks 24 and 26 of the lower roll being journalled in bearings 28 and 30. The four bearings are supported in rolling mill body 32 and adjustable relative to one another by screws 34 and 36. The rolls are driven by an electric motor, indicated by numeral 40, through shaft 42, coupling 44, drive 46, and couplings 48 and 50 connecting shafts 52 and 54, respectively, with rolls 12 and 14. While the present mechanical power transmission coupling is particularly suitable for rolling mills, it is capable of being adapted to various other types of equipment, the rolling mills being shown in the drawings and described in the application primarily for the purpose of illustrating one particular use of the present invention.

Figure 3:
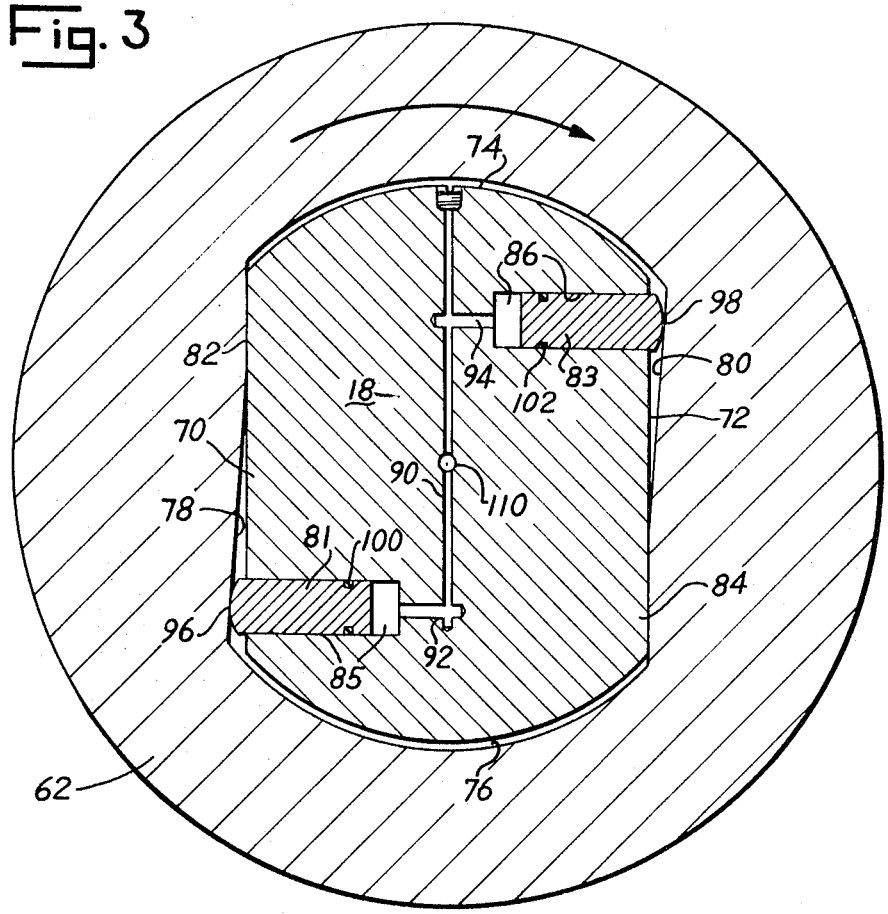
FIG. 3 is an enlarged transverse cross sectional view of the roll neck and the adapter of the present mechanical power transmission coupling.

Each coupling 48 and 50 includes a shaft 58 and adapters 60 for connecting the coupling to output shaft 52 and adapter 62 for connecting shaft 58 to the reduced outer portion of the neck 18. The ends of the shaft 58 include enlarged splines 64 and 66, each of which intermeshes with an annular spline surface on the inner portion of the respective adapter to permit the drive to be offset angularly as particularly illustrated in the transmission coupling 50. The necks of the two rolls to which the couplings are connected have oppositely disposed lands 70 and 72 and curved surfaces 74 and 76 interconnecting the two lands. The adapter has a bore of essentially the same shape for receiving the neck; however, in the embodiment illustrated in the drawings, the straight walls 78 and 80 are curved in the areas identified by numerals 82 and 84 to provide a relatively large contact surface between the flat lands 70 and 72 and the corresponding sides 78 and 80 of the adapter. When the adapter is driven in the direction indicated by the arrows, surfaces 82 and 84 contact a relatively large area on the adjacent roll neck surfaces 70 and 72. While the areas 82 and 84 are not required for the present invention to perform properly, less fretting and wear occurs with the relationship illustrated in the drawings in FIG. 3.

The adapter fits relatively loosely on the neck in order to permit the adapter to be easily assembled; however, the looseness required to permit the parts to be easily assembled would result in excessive wear, fretting, and backlash, and would very probably result in premature failure of the coupling structure. The present invention overcomes these difficulties by providing a take-up mechanism consisting of two pistons 81 and 83 disposed in cylinders 85 and 86, and urged outwardly by hydraulic pressure from passage 90 which is connected by passages 92 and 94 to cylinders 85 and 86, respectively. As the hydraulic pressure increases in the inner end of the cylinder, the outer ends 96 and 98 of the pistons engage the adjacent side walls 78 and 80, thus locking the adapter firmly in a fixed position relative to the neck, and thus preventing relative movement between the adapter and the neck. Annular seals 100 and 102 are preferably provided between the piston and cylinder to form a fluid-tight relationship therebetween.

Figure 2:
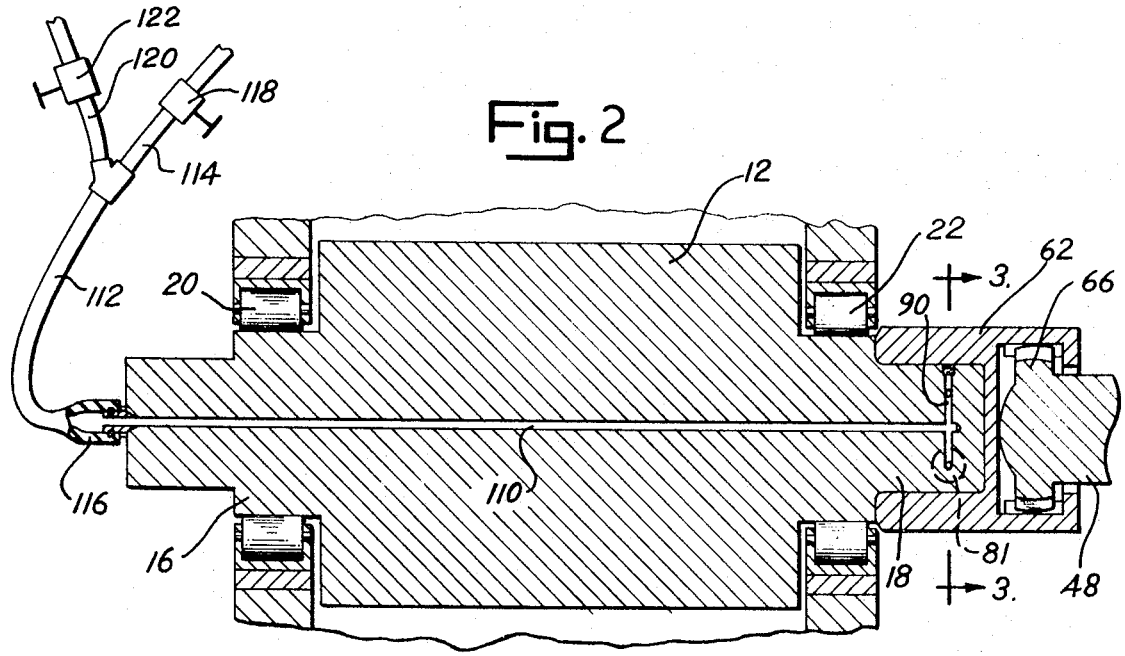
FIG. 2 is an enlarged view of one of the rolls of the rolling mill illustrated in FIG. 1 showing the present power transmission coupling connected thereto.
Figure 4:
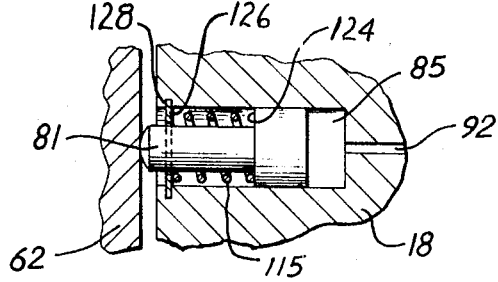
FIG. 4 is a fragmentary cross sectional view of a portion of the present power transmission coupling, showing a modified form thereof.

The hydraulic fluid is supplied to passage 90 and thence to the two cylinders 85 and 86 by a passage 110 extending longitudinally from the left hand of the roll as shown in FIG. 2 to passage 90. The left hand end of passage 110 is connected to a suitable source of hydraulic pressure by conduits 112 and 114 and a coupling 116 connecting conduit 112 to passage 110 in such a manner that the roll is free to rotate while the adjacent end of conduit 112 remains stationary. A valve 118 for controlling the hydraulic fluid delivered to the two cylinders 85 and 86 is disposed in conduit 114. In the embodiment illustrated in the drawings, the hydraulic fluid is released and the pistons 81 and 83 are retracted by a hydraulic return line 120 controlled by valve 122, line 120 being connected to the vacuum side of a hydraulic pump which withdraws the hydraulic fluid from passages 110, 90, 92, and 94, and hence from the inner ends of the cylinders 85 and 86, thus retracting pistons 81 and 83 and thereby releasing the adapter to permit it to be easily removed from the roller neck. The retracting operation performed by the arrangement shown in the drawings is in effect controlled by a negative pressure in lines 120 and 112. As an alternative, the cylinders may be retracted by a spring 115 shown in FIG. 4, reacting between a shoulder 124 on the piston and the snap ring 126 seated in a groove 128 in the side wall of a modified form of cylinders 85 and 86.

In the use and operation of the present power transmission coupling, the adapter 62 is mounted on the roll neck and the remainder of the coupling assembled in position as illustrated in FIG. 1. When the rolling mill is to be used, valve 118 is opened to admit hydraulic fluid under pressure to passages 110, 90, 92, and 94, and into the respective cylinders 85 and 86, thereby forcing pistons 81 and 83 outwardly until the rounded ends 96 and 98 seat firmly on the adjacent surfaces of the adapter, thus forcing the surfaces 82 and 84 of the adapter into firm contact with the adjacent areas on lands 70 and 72. The adapter and roll neck are held in firm engagement with one another and are prevented from moving with respect to one another. If undue torque is applied by the adapter to the roll, the hydraulic piston may yield sufficiently to eliminate or minimize shock to the roll, thus providing a smoother operation and preventing damage to the coupling structure and mill mechanism. If, in some instances, a reverse torque occurs, or a series of reverse torque operations occurs, the hydraulic pistons will usually be under sufficient pressure to retain the neck and adapter in firm contact, thus eliminating backlash and avoiding fretting and excess wear of the adapter and the neck parts and surfaces; however, if sufficient reverse torque occurs to cause the pistons to retract slightly, the pistons absorb and cushion the shock and again return the adapter and roll neck to their locked condition.

Normally when the rolling mill is not in operation, the hydraulic pressure in conduit 112 and passage 110 is relieved, thus permitting the coupling adapter to remain relatively loose on the roll neck. When the coupling is to be removed from the roll neck, valve 122 is opened, and since it is connected to the intake side of a hydraulic pump, a negative pressure is created in passages 110, 92, and 94, and thus in cylinders 85 and 86. This causes pistons 81 and 83 to retract and release the adapter so that it can be easily removed from the roll neck. In the modification illustrated in FIG. 4, when the pressure in conduit 112 is relieved, springs 115 automatically retract the two pistons so that the adapter can be removed without the negative pressure of the embodiment previously described herein.

Figure 5:
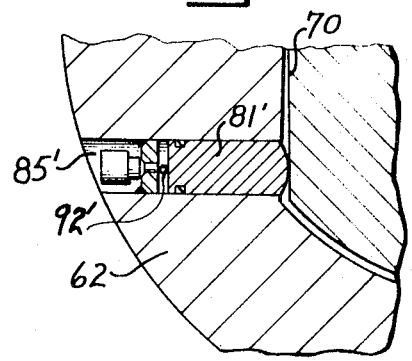
FIG. 5 is a modified form illustrating reversal of parts.

In FIG. 5 one of the pistons 81' with cylinder 85' is shown in the adapter 62 instead of in neck 70. The operation is essentially the same as that previously described hereinabove.

While only one embodiment of the present mechanical power transmission coupling has been described in detail herein, and only one modification mentioned, various changes and further modifications may be made without departing from the scope of the invention.

I claim:

1. A mechanical power transmission coupling structure for a rolling mill roll having a neck for connection with a drive, said structure comprising two diametrically opposed external lands on said roll neck, a connector member having a bore therein of substantially the same shape as and slightly larger than said neck and with internal lands corresponding to the external lands on said neck, two fluid cylinders in said neck, each of said cylinders being offset toward the side of a land in the same peripheral direction from the center of its respective land and extending generally perpendicularly to said lands, a piston in each of said cylinders having an outer end engaging the surface of the internal lands on said member, passages in said roll neck connected to said cylinders for supplying fluid under pressure to increase the pressure on said pistons after said neck and connector member have been assembled and force said pistons into engagement with the respective lands on said member and seat the opposite land of said roll neck on the corresponding land of said member.

2. A mechanical power transmission coupling structure as defined in claim 1 in which one of said fluid passages extends the full axial length of the rolling mill roll and in which a coupling connects said passage with a source of hydraulic fluid.

3. A mechanical power transmission coupling structure as defined in claim 1 in which a spring means retracts each of said pistons when the pressure of the fluid is relieved.

4. A mechanical power transmission coupling structure as defined in claim 1 in which the internal lands on said connector member are each on two separate planes to provide an increased area for engagement with the lands on said roller neck.

5. A mechanical power transmission coupling structure comprising a shaft means having an end with an external land thereon, a connector means having a bore of substantially the same shape as and slightly larger than said shaft means and with an internal land in the wall thereof, a fluid operated member disposed in one of said means engaging the land on the other of said means near the side thereof, and a source of fluid under pressure with means for increasing the pressure on said fluid operated member after said shaft means and connector means have been assembled, for urging the opposite ends of said lands together.

6. A mechanical power transmission coupling structure as defined in claim 5 in which said fluid operated member is disposed in said shaft means.

7. A mechanical power transmission coupling structure as defined in claim 5 in which said fluid operated member includes a piston disposed in a cylinder positioned substantially perpendicular to said land.

8. A mechanical power transmission coupling structure, comprising a shaft having an end with two opposed lands thereon, a connector means having a bore therein of substantially the same shape as and slightly larger than said shaft end and with two internal lands corresponding to the external lands on said shaft end, two fluid operated members disposed in one of said means at the corresponding sides of said lands and engaging the other of said lands for urging the opposite sides of said lands together, and means defining fluid passages in said one means for transmitting fluid under pressure to said fluid operated members and with means for increasing the pressure on said fluid operated members after said shaft ends and connector means have been assembled.

9. A mechanical power transmission coupling structure as defined in claim 8 in which said two fluid operated members consist of a piston and cylinder.

10. A mechanical power transmission coupling structure as defined in claim 9 in which said fluid operated members are disposed in said shaft means.

11. A mechanical power transmission coupling structure as defined in claim 10 in which means define a passage within said shaft means for transmitting fluid pressure from a source to said cylinders to operate said pistons.

References Cited

UNITED STATES PATENTS

| | | | |
|---|---|---|---|
| 2,909,045 | 10/1959 | Burns | 64—9 |
| 2,918,826 | 12/1959 | Miller | 74—409 X |
| 3,455,122 | 7/1969 | Greenberg | 64—23 |
| 3,456,760 | 7/1969 | Musse et al. | 64—7 |
| 3,473,406 | 10/1969 | Runkle | 64—23 |

ANDREW V. KUNDRAT, Primary Examiner

U.S. Cl. X.R.

287—53; 643—9 R